United States Patent [19]

EerNisse et al.

[11] 4,372,173
[45] Feb. 8, 1983

[54] RESONATOR FORCE TRANSDUCER

[75] Inventors: Errol P. EerNisse, Sandy, Utah; Jerome M. Paros, Redmond, Wash.

[73] Assignee: Quartex, Inc., Salt Lake City, Utah

[21] Appl. No.: 198,705

[22] Filed: Oct. 20, 1980

[51] Int. Cl.³ .............................................. G01L 1/10
[52] U.S. Cl. .................. 73/862.59; 73/778; 73/DIG. 1; 73/DIG. 4
[58] Field of Search .......... 73/DIG. 1, DIG. 4, 581, 73/517 AV, 702, 704, 778, 862.59; 310/338; 331/155, 156

[56] References Cited

U.S. PATENT DOCUMENTS

| | | | |
|---|---|---|---|
| 3,238,789 | 3/1966 | Erdley | 73/DIG. 4 |
| 3,659,230 | 4/1972 | Tanaka et al. | 331/156 X |
| 4,215,570 | 8/1980 | Nisse | 73/DIG. 4 |
| 4,299,122 | 11/1981 | Ueda et al. | 73/862.59 |

FOREIGN PATENT DOCUMENTS 576518 10/1977 U.S.S.R. ............... 73/DIG. 1

Primary Examiner—Charles A. Ruehl
Attorney, Agent, or Firm—Thorpe, North & Western

[57] ABSTRACT

A vibratory, force transducer includes a pair of elongate, generally parallel bars coupled together at their ends in a type of double-ended tuning fork arrangement. The bars each have a thickness of t, a width of w and a length between fixed ends of L. The distance separating the points where the bars are coupled together is m. Apparatus is provided to cause the bars to vibrate in a transverse direction and in substantially 180° phase opposition. Apparatus is also provided for determining the frequency of vibration of the bars so that when the bars are subjected to either compressive or tensile forces along the longitudinal axis of the bars, the magnitude of such forces can be readily determined by simply determining the magnitude of the frequency change. The values of w and t are selected so that $0.4 < t/w < 4$, and this reduces the likelihood of buckling the transducer when it is subjected to compressive forces while also maintaining a configuration which is relatively easy to fabricate using a photolithographic process. The values of t, w, L and m are selected so that various spurious modes of oscillation of the transducer, which causes a reduction in the mechanical Q and thus an erroneous reading of applied forces, are avoided. The disclosed selection processes for t, w, and L may be applied also to single beam flexure mode transducers to avoid spurious modes of oscillation while maintaining a configuration which is relatively easy to fabricate using photolithographic processes.

22 Claims, 3 Drawing Figures

RESONATOR FORCE TRANSDUCER

BACKGROUND OF THE INVENTION

This invention relates to a vibratory transducer whose dimensions are selected for ease of fabrication and to avoid buckling and spurious modes of operation.

Double-bar transducer elements formed in the shape of double-ended tuning forks have been proposed for a variety of uses including use of an ultrasonic transducer with feedback control (U.S. Pat. No. 3,148,289), use as an accelerometer element (U.S. Pat. No. 3,238,789), use as a force transducer (U.S. Pat. No. 4,215,570), and use in a beat frequency oscillator (U.S. Pat. No. 2,854,581). In the latter three mentioned references, the double-bar transducer element is utilized to measure forces applied to the bars along the longitudinal axes thereof.

Among the advantages of the double-bar transducer arrangement, at least those which utilize a rigid material such as quartz, is a high mechanical Q which in turn provides high resolution. The high mechanical Q is achieved in part because the bars are caused to vibrate in 180° phase opposition, with the bars being coupled together at their ends at nodes so that very little energy is lost to the mounting structure during each cycle of vibration.

One problem which has been discovered with the double-bar vibratory transducer is that a number of spurious modes of operation may develop over the operational range of the device and these spurious modes result in a lowering of the mechanical Q of the device, a shift in frequency, and a possible cessation of oscillation at the desired natural resonant frequency, i.e., transversely in a generally 180° phase opposition. This desired resonant frequency changes with a change in the application of compressive or tensile forces in the longitudinal direction to the transducer, and this characteristic enables use of the device as a force transducer. However, during operation of the transducer spurious modes of operation may develop including (a) flexure or oscillation of the bars in phase in a direction normal to the plane of the transducer, and (b) flexure or oscillation of the bars 180° out of phase in a direction normal to the plane of the transducer. Further, the first mentioned spurious mode has overtone frequencies in addition to the fundamental frequency. These spurious modes may be excited by the longitudinal pumping motion of the structure resulting from the bars flexing in and out, by the piezoelectric effect (assuming piezoelectric material is used) if the structure's geometry is poorly chosen, and by the nonlinear elastic behavior of the transducer material. The existence of these spurious modes of operation have not been recognized in the past. Because acoustic energy can transfer from the desired resonant mode to the spurious modes, they can result in a "glitch" or "dead" region where the transducer will not measure an applied force or, at best, it will measure it incorrectly.

In addition to the above-described spurious mode problem with double-bar vibratory transducers, another problem is that of buckling. In particular, attempted miniaturization of the transducer may result in a structure which simply cannot withstand certain compressive forces to which it may be subjected. In such cases, the transducer bends or buckles and is thereby rendered inoperative.

The above first-mentioned spurious mode (and its overtones) problem, although discussed with respect to double-bar transducers, also applies to single beam, force transducers and as described in U.S. Pat. Nos. 3,470,400 and 3,479,536, and the invention to be described hereinafter is applicable in some instances to such single beam structures.

Another factor to be considered for both double-bar transducers and single beam transducers is the need for configurations which will allow use of photolithography and chemical etching for fabrication. Such fabrication techniques provide cost advantages, miniaturization and tight dimensional control.

SUMMARY OF THE INVENTION

It is an object of the invention to provide a vibratory transducer having a high mechanical Q.

It is another object of the invention to provide such a transducer which is accurate over a wide range of operating conditions.

It is a further object of the invention to provide such a transducer which is relatively easy to fabricate and yet not readily susceptible to buckling.

It is still another object of the invention to provide such a transducer constructed to minimize the possibility of certain anomalous and spurious modes of oscillation.

The above and other objects of the invention are realized in a specific illustrative embodiment which includes a pair of elongate, generally parallel and spaced apart bars coupled together at their ends in the form of a double-ended tuning fork. The thickness of each of the bars is t, the width is w, and the length between fixed ends is L. The distance between the points at which the bars are connected is m. To minimize the possibility of buckling while also maintaining a configuration which is relatively easy to fabricate using photolithographic processes, the dimensions t and w are selected so that $$0.4 < t/w < 4.$$

Additionally, the dimensions t, w, L, and m are selected so that certain spurious modes of operation may be avoided. In particular, avoidance of these modes requires further careful selection of the values of ratios t/w and L/m.

In an alternative embodiment of the invention, a single beam transducer (represented by the case where L/m=1) includes dimensions t, w, and L, selected so that certain spurious modes of operation are avoided. The ratio t/w is selected also so that $0.4 < t/w < 4$.

BRIEF DESCRIPTION OF THE DRAWINGS

The above and other objects, features and advantages of the invention will become apparent from a consideration of the following detailed description presented in connection with the accompanying drawings in which.

DETAILED DESCRIPTION

Figure 1:
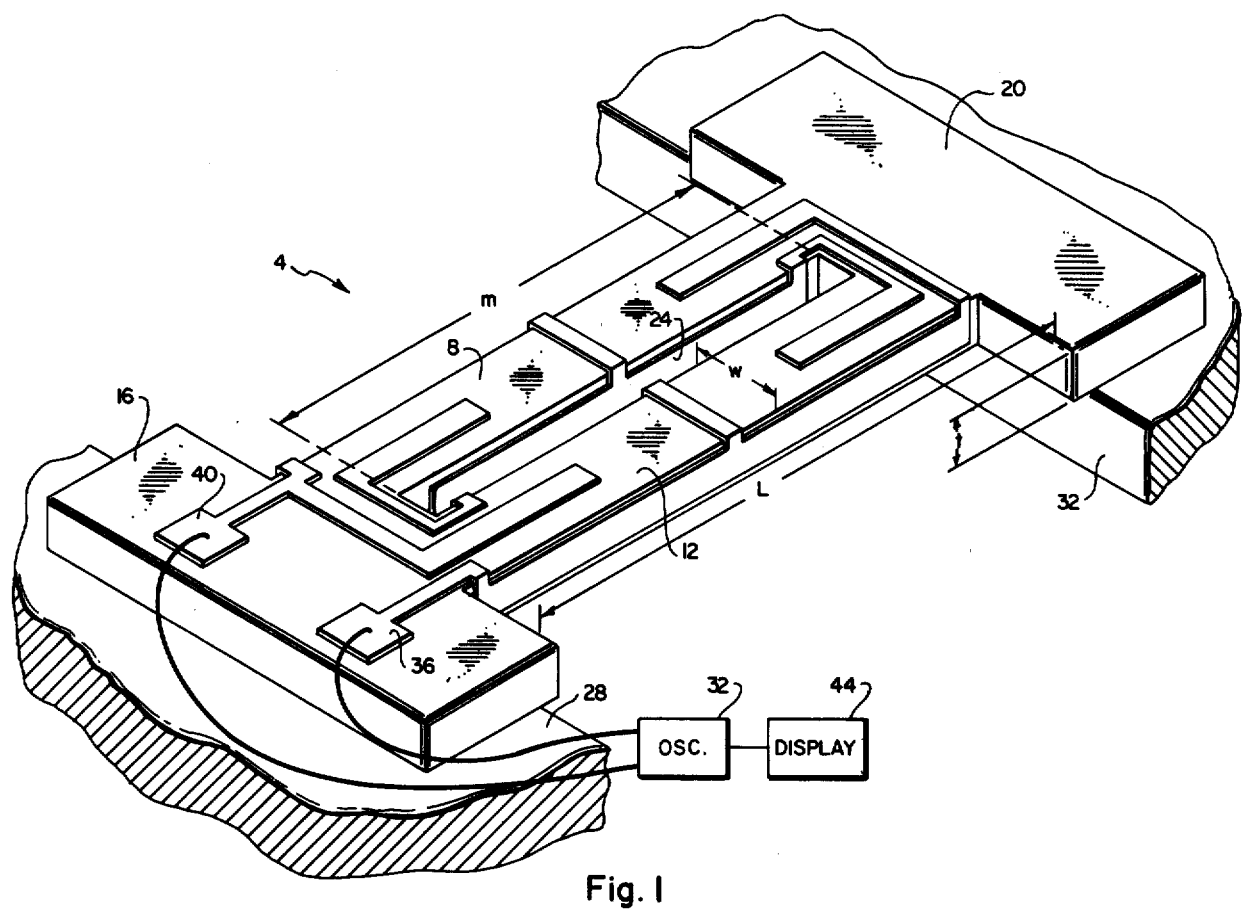
FIG. 1 shows a perspective view of a double-bar vibratory force transducer made in accordance with the principles of the present invention.

FIG. 1 shows a double-bar vibratory transducer 4 made of piezoelectric material and composed of a pair of generally parallel bars 8 and 12 coupled together at their ends and enlarged or widened end portions 16 and 20. A slot 24 separates the two bars 8 and 12. The widened end portions 16 and 20 are used for mounting the transducer on suitable support structure 28 and 32. Advantageously, the transducer may be made of a piezoelectric material such as quartz.

The various dimensions of the transducer are labeled in the drawing, with t representing the thickness of the bars, w representing the width of the bars, L representing the length of the bars (i.e., the distance between the widened end portions 16 and 20), and m representing the length of the slot. Exemplary values and ranges of values for these dimensions will be given later.

An oscillator circuit 32 is coupled to thin electrode films or coatings 36 and 40 disposed on various surfaces of the transducer 4 as shown in the drawing. Application of A.C. signals by the oscillator 32 to the electrode films 36 and 40 produces stress forces in the bars 8 and 12 to cause the bars to vibrate in a transverse direction in 180° phase opposition. That is, the bars 8 and 12 are caused to alternately bulge outwardly away from each other and then inwardly toward each other, etc., in a well known manner and at a characteristic or desired natural resonant frequency.

When either a compressive or tensile force (longitudinal or axial) is applied to the bars 8 and 12, the frequency of vibration of the bars is caused to change, and the magnitude of the change serves as a measure of the applied force. The oscillator 32 follows in frequency the frequency of the transducer and so the change in frequency of the transducer can be measured by simply measuring the output frequency of the oscillator. A conventional counter and display 44 may be connected to the oscillator 32 to provide a read out of the applied forces.

The widened end portions 16 and 20 of the transducer 4 are provided to give certainty to the dimension L (length of the bars 8 and 12), regardless of the locations at which the ends of the transducer are bonded or otherwise fixed to support structure. Without the widened end portions, the dimension L could vary from one device to another since L would then be measured from the edge of one attachment joint to the edge of the other. Since it is difficult to mount (attach) consistently to the same locations each time a device is used, consistency and preciseness in the dimension L would be hard to achieve. For reasons to be discussed later, it is important that the dimensions of the transducer 4, including the dimension L, be carefully selected and maintained to avoid certain undesirable modes of operation.

Figure 2:
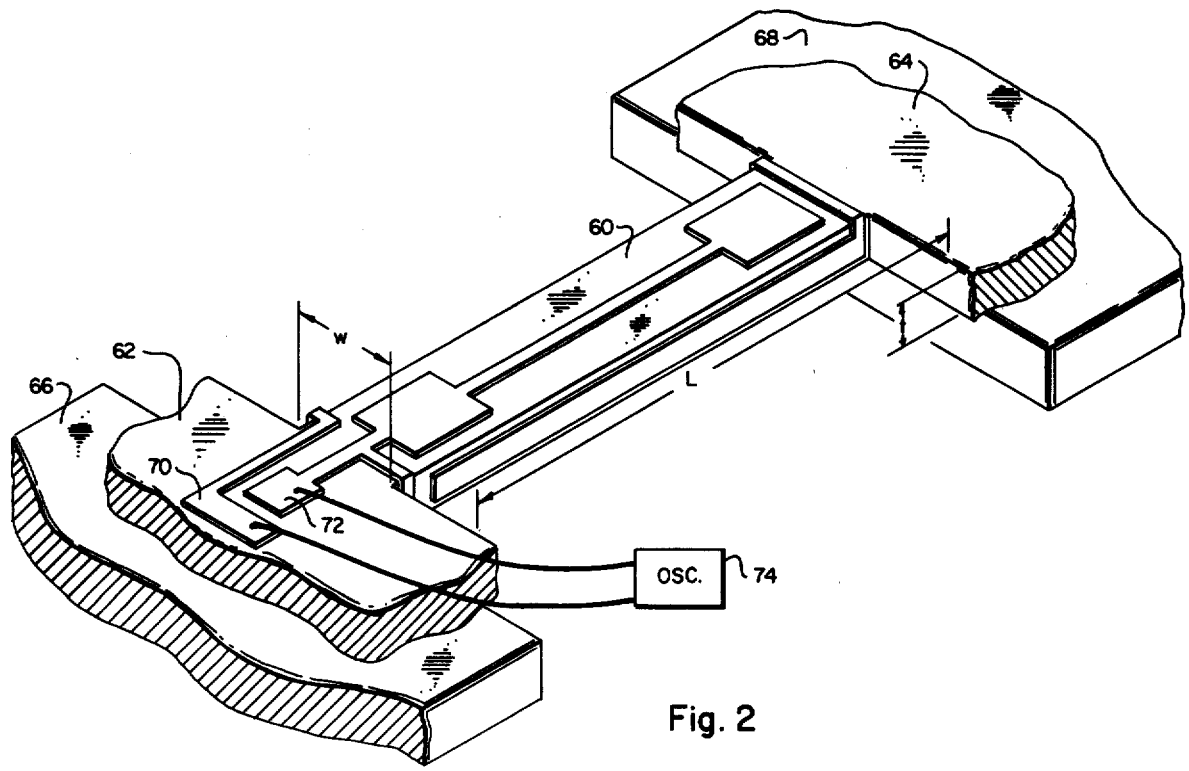
FIG. 2 shows a perspective view of a single beam transducer also made in accordance with the principles of the present invention.

FIG. 2 shows a single beam transducer composed of a single bar or beam 60 fixed between widened sections 62 and 64 which, in turn, are mounted on support structures 66 and 68. The widened sections 62 and 64 are provided to isolate the ends of the beam from the acoustic energy of the vibrating beam so that acoustic energy is not lost to the support structures 66 and 68 as described in U.S. Pat. Nos. 3,470,400 and 3,479,536.

The various dimensions of the single beam transducer are labeled to coincide with corresponding dimensions (where applicable) of the double-bar transducer of FIG. 1. The dimensions are t, representing the thickness of the bar, w, representing the width of the bar, and L representing the length of the bar (i.e., the distance between the widened sections).

Thin electrodes 70 and 72 are disposed on selected surfaces of the beam 60 as shown. Application of A.C. signals to the electrodes 70 and 72 by an oscillator circuit 74 produces stress force in the beam 60 to cause the beam to vibrate in a transverse sideways direction.

Before describing specific illustrative dimensions of applicant's invention some of the principles governing the operation of vibratory transducers will be discussed. Although the frequency change with applied load is nonlinear, the first order force sensitivity S of a force transducer provides a measure of the ability of the transducer to detect changes in applied force F and is defined as the fractional change in frequency with applied force as follows:

$$S = \frac{0.148}{E}\left(\frac{m}{w}\right)^2 \frac{F}{2tw}, \tag{1}$$

for a double-bar vibratory transducer; and $$S = \frac{0.148}{E}\left(\frac{m}{w}\right)^2 \frac{F}{tw} \tag{2}$$

for a single beam transducer where L=m.

Here E is Young's modulus of the transducer material and F is the applied force. It is apparent that an increase in the ratio m/w will increase the sensitivity of the transducer. However, increasing m/w also increases the susceptibility of the transducer to buckling.

The critical force which will cause buckling of a double-bar transducer in the direction perpendicular to the vibration plane, i.e., the mt plane, is given approximately by $$F_{cp} = \frac{2\pi^2 t^3 wE}{3L^2} \tag{3}$$

Of course, it is desirable that $F_{cp}$ be greater than the maximum or full scale load $F_{FS}$ applied to the transducer so as to avoid buckling, or in other words that the following ratio be greater than one (using equations 1 and 3):

$$\frac{F_{cp}}{F_{FS}} = \frac{0.148\pi^2 t^2 m^2}{3 S_{FS} w^2 L^2} \tag{4}$$

As can be seen from FIG. 1, the ratio L/m is on the order of 1, a desirable value being about 1.2. Although as large a full scale frequency shift as possible is desired (so that the undesired frequency shifts due to temperature changes, surface contamination on the crystal surface, etc., are negligible) it has been found that an $S_{FS}$ of 0.1 is about the largest practical value (because of nonlinearities which occur with higher sensitivities). Since $F_{cp}/F_{FS}$ must be greater than 1 to avoid buckling in the useable range of loads, we find for values of $S_{FS}=0.1$ and L/m=1.2, that $$(t/w) > 0.54 \tag{5}$$

For $S_{FS}$ of 0.05, still large enough to be a useable value, $$(t/w) > 0.38 \tag{6}$$

For t/w on the order of 1 or greater, buckling would occur first in the wm plane, the plane of vibration. Here the critical buckling force is given approximately by $$F_{ci} = \frac{2\pi^2 t w^3 E}{3 m^2} \tag{7}$$

Forming the ratio $F_{ci}/F_{FS}$ using Equation 1, gives $$F_{ci}/F_{FS} = \frac{0.148 \pi^2}{3 S_{FS}} \tag{8}$$

and we see that this ratio is greater than 1 for every $S_{FS}$ less than 0.48, so buckling is not a problem in this direction.

If the devices are used in tension only, buckling is not a concern but tensile strength still is. It is thus important to keep the dimensions t and w large enough to avoid stresses nearing the tensile limit of the material being used, but not so large that fabrication by photolithographic processes is difficult.

Similar equations may be readily derived for the single beam transducer and lead to the same conclusions about t/w as Equations 5 and 6.

It has been found that a width w of less than 0.004" is difficult to achieve repeatedly in photolithographic processes due to undercutting of the photoresist patterns used in the processes. It has also been found that thicknesses t greater than 0.016" are difficult to achieve because the chemical etchants used to etch quartz, for example, attack the mask materials and the masks begin to fail when exposed to etchant long enough to etch through 0.016" of quartz. In view of these findings, the maximum practical value of t/w is about 4.

In view of the above, it is clear that a judicious compromise is needed in the selection of transducer dimensions to achieve high sensitivity, reduce the liklihood of buckling, and maintain the ease of fabrication. These objectives can be achieved when w and t are selected so that $$0.4 < t/w < 4$$

These dimensions are different from those taught in the prior art including the transducer described in U.S. Pat. No. 4,215,570 (where neither the buckling nor spurious mode problem was addressed), U.S. Pat. No. 3,238,789, and an associated publication entitled "Technical Report on the Quartz Resonator Digital Accelerometer", Norman R. Serra, 43rd AGARD Conference Proceedings 1967. The critical nature of the dimensions are not mentioned in the latter cited patent or the publication, but the dimensions of the bars are given in the publication as being 40 mils in thickness and 10 mils in width.

It has been discovered, as earlier discussed, that certain spurious modes of oscillation may develop in a double-bar vibratory transducer. These modes are: a. flexure or oscillation of the bars in a direction normal to the plane of the transducer and in phase ($F_{pn}$), and b. flexure of the bars in a direction normal to the plane, but out of phase ($F_d$), where n indicates the nth overtone. When the frequency of oscillation of these spurious modes equal the desired natural resonant frequency, then the mechanical Q of the transducer is dramatically decreased because acoustic energy is transferred to the undesired mode and any reading of applied force is either non-existent or incorrect. It is thus desirable to construct the transducer so that these spurious modes are avoided, i.e., so that the desired natural or characteristic frequency (or multiples thereof) of the transducer do not equal the spurious mode resonant frequencies.

The desired resonant or characteristic frequency f at a load F for a double-bar quartz transducer constructed in accordance with the structure shown in the drawings is given by:

$$f = \frac{4.73^2}{4\sqrt{3\pi}} \left(\frac{E}{P}\right)^{\frac{1}{2}} \frac{w}{m^2} \left(1 + \frac{0.148 \, F m^2}{E \, 2tw \, w^2}\right) \tag{9}$$

where P is mass density of the transducer and the factor 4.73 is the root of the solution for vibration of a clamped-clamped beam.

The resonant frequencies of the spurious modes of oscillation of the transducer at a load F have been determined to be as follows:

$$f_{p1} = \frac{4.73^2}{4\sqrt{3\pi}} \left(\frac{E}{P}\right)^{\frac{1}{2}} \frac{t}{L^2} \left[1 + \frac{0.148 \, F L^2}{E \, 2tw \, t^2}\right] \tag{10}$$

$$f_{p2} = \frac{7.85^2}{4\sqrt{3\pi}} \left(\frac{E}{P}\right)^{\frac{1}{2}} \frac{t}{L^2} \left[1 + \frac{0.073 \, F L^2}{E \, 2tw \, t^2}\right] \tag{11}$$

$$f_{p3} = \frac{11^2}{4\sqrt{3\pi}} \left(\frac{E}{P}\right)^{\frac{1}{2}} \frac{t}{L^2} \left[1 + \frac{0.040 \, F L^2}{E \, 2tw \, t^2}\right] \tag{12}$$

$$f_d = \frac{4.73^2}{4\sqrt{3\pi}} \left(\frac{E}{P}\right)^{\frac{1}{2}} \frac{t}{m^2} \left[1 + \frac{0.148 \, F m^2}{E \, 2tw \, t^2}\right] \tag{13}$$

Equations 9–13 can be rewritten, with the use of Equation 1, as follows:

$$f = \frac{4.73^2}{4\sqrt{3\pi}} \left(\frac{E}{P}\right)^{\frac{1}{2}} \frac{w(1+S)}{m^2} \tag{14}$$

$$f_{p1} = \frac{4.73^2}{4\sqrt{3\pi}} \left(\frac{E}{P}\right)^{\frac{1}{2}} \frac{t}{L^2} \left(1 + \frac{S w^2 L^2}{t^2 m^2}\right) \tag{15}$$

$$f_{p2} = \frac{7.85^2}{4\sqrt{3\pi}} \left(\frac{E}{P}\right)^{\frac{1}{2}} \frac{t}{L^2} \left(1 + 0.49 \frac{S w^2 L^2}{t^2 m^2}\right) \tag{16}$$

$$f_{p3} = \frac{11^2}{4\sqrt{3\pi}} \left(\frac{E}{P}\right)^{\frac{1}{2}} \frac{t}{L^2} \left(1 + 0.27 \frac{S w^2 L^2}{t^2 m^2}\right) \tag{17}$$

$$f_d = \frac{4.73^2}{4\sqrt{3\pi}} \left(\frac{E}{P}\right)^{\frac{1}{2}} \frac{t}{m^2} \left(1 + S \frac{w^2}{t^2}\right) \tag{18}$$

In order to avoid the spurious modes, the dimensions and, in particular, the ratios t/w and L/m must be selected so that the desired characteristic resonant frequency f and multiples thereof of the transducer, do not equal one of the spurious mode resonant frequencies anywhere in the operating range, i.e., for any sensitivity value S in the desired range of S. That is, it is desirable that the following inequalities hold for any S between $S_{min}$ and $S_{max}$; where S less than 0 is compression, S greater than 0 is tension, and $S_{min}$ and $S_{max}$ are determined by the specific application and transducer design.

$$\frac{f}{f_{p1}} = \frac{wL^2(1+S)}{tm^2\left(1+S\frac{L^2w^2}{m^2t^2}\right)} \neq 1 \quad (19)$$

$$\frac{2f}{f_{p1}} = \frac{2wL^2(1+S)}{tm^2\left(1+S\frac{L^2w^2}{m^2t^2}\right)} \neq 1 \quad (20)$$

$$\frac{f}{f_{p2}} = \frac{0.363\,wL^2(1+S)}{tm^2\left(1+0.49\,S\frac{L^2w^2}{m^2t^2}\right)} \neq 1 \quad (21)$$

$$\frac{2f}{f_{p2}} = \frac{0.726\,wL^2(1+S)}{tm^2\left(1+0.49\,S\frac{L^2w^2}{m^2t^2}\right)} \neq 1 \quad (22)$$

$$\frac{f}{f_{p3}} = \frac{0.185\,wL^2(1+S)}{tm^2\left(1+0.27\,S\frac{L^2w^2}{m^2t^2}\right)} \neq 1 \quad (23)$$

$$\frac{2f}{f_{p3}} = \frac{0.370\,wL^2(1+S)}{tm^2\left(1+0.27\,S\frac{L^2w^2}{m^2t^2}\right)} \neq 1 \quad (24)$$

$$\frac{f}{f_d} = \frac{w(1+S)}{t\left(1+S\frac{w^2}{t^2}\right)} \neq 1, \text{ and} \quad (25)$$

$$\frac{2f}{f_d} = \frac{2w(1+S)}{t\left(1+S\frac{w^2}{t^2}\right)} \neq 1 \quad (26)$$

(Equations 19–24 apply also to single beam devices where $L/m = 1.0$ and S is the force sensitivity of a single beam device.) Any values of t/w and L/m for which one of the above inequalities does not hold for S between $S_{min}$ and $S_{max}$ will give rise to a spurious mode somewhere between $S_{min}$ and $S_{max}$. One illustrative set of values for t/w and L/m for which all the inequalities hold for S between $-0.1$ and $+0.1$ are as follows:

$t/w = 0.8$ $L/m = 1.20$

With these ratios, not only are the identified spurious modes avoided, but also there is little chance of buckling, and fabrication using photolithographic etching processes may be readily achieved. Other possible allowable ratios for an application with S ranging from $-0.1$ to $0.1$ are shown in the graph of FIG. 3.

Figure 3:
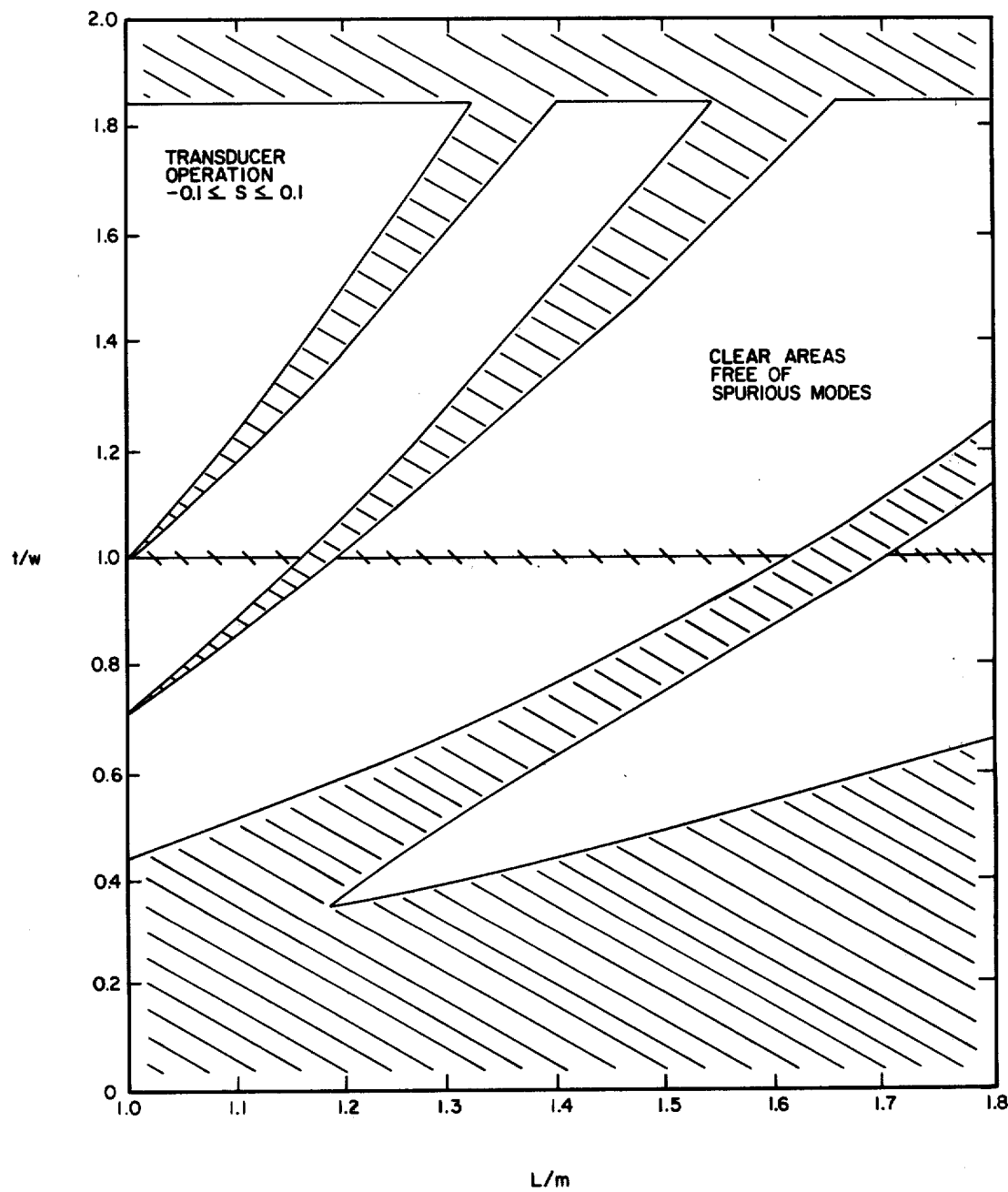
FIG. 3 is a chart showing the range of values useable for t/w and L/m for operation of a certain transducer free from spurious modes.

FIG. 3 shows a plot of t/w and L/m, where the shaded regions represent values of t/w and L/m which will lead to a spurious mode occurring at some load between $S_{min}$ and $S_{max}$. The clear regions represent values of t/w and L/m which will give a transducer operable free of spurious modes for all loads between $S_{min}$ and $S_{max}$.

FIG. 3 also can be used for design of single beam transducers by observing the intersection of the clear regions with the $L/m = 1.0$ boundary.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements.

What is claimed is:

1. A vibratory force transducer comprising
   a pair of elongate, generally parallel bars coupled together at their ends and adapted to vibrate 180° out of phase in a transverse direction, said bars each having a thickness t and a width w, the distance between the locations at which the bar ends are coupled together being m and the lengths of the bars being generally L, wherein $0.4 < t/w < 4$, and $L/m \geq 1$, means for causing said bars to resonate at a frequency f in substantially 180° phase opposition in a transverse direction, said frequency varying with variation in force applied longitudinally to said bars.

2. A transducer as in claim 1 wherein t, w, L, and m are selected so that for any value of S in the range $S_{min}$ to $S_{max}$, where S is the force sensitivity of the transducer, with positive values of S representing tensile forces and negative values representing compressive forces, and $S_{min}$ and $S_{max}$ are the minimum and maximum values of S respectively used to define the desired operating range, the following inequality holds:

$$\frac{f}{f_{p1}} = \frac{wL^2(1+S)}{tm^2\left(1+S\frac{L^2w^2}{m^2t^2}\right)} \neq 1,$$

where $F_{p1}$ is the fundamental resonant frequency of the bars in a spurious mode where the bars oscillate in phase in a direction normal to the plane of the bars.

3. A transducer as in claim 2 wherein t, w, L, and m are selected so that:

$$\frac{2f}{f_{p1}} = \frac{2wL^2(1+S)}{tm^2\left(1+S\frac{L^2w^2}{m^2t^2}\right)} \neq 1.$$

4. A transducer as in claim 2 wherein t, w, L, and m are selected so that:

$$\frac{f}{f_{p2}} = \frac{0.363\,wL^2(1+S)}{tm^2\left(1+0.49\,S\frac{L^2w^2}{m^2t^2}\right)} \neq 1,$$

where $f_{p2}$ is the second overtone of $f_{p1}$.

5. A transducer as in claim 2 wherein t, w, L, and m are selected so that:

$$\frac{2f}{f_{p2}} = \frac{0.726 \, w \, L^2 (1 + S)}{t \, m^2 \left(1 + 0.49 \, S \frac{L^2 w^2}{m^2 t^2}\right)} \neq 1,$$

where $f_{p2}$ is the second overtone of $f_{p1}$.

6. A transducer as in claim 2 wherein t, w, L, and m are selected so that:

$$\frac{f}{f_{p3}} = \frac{0.185 \, w \, L^2 (1 + S)}{t \, m^2 \left(1 + 0.27 \, S \frac{L^2 w^2}{m^2 t^2}\right)} \neq 1,$$

where $f_{p3}$ is the third overtone of $f_{p1}$.

7. A transducer as in claim 2 wherein t, w, L and m are selected so that:

$$\frac{2f}{f_{p3}} = \frac{0.370 \, w \, L^2 (1 + S)}{t \, m^2 \left(1 + 0.27 \, S \frac{L^2 w^2}{m^2 t^2}\right)} \neq 1,$$

where $f_{p3}$ is a third overtone of $f_{p1}$.

8. A transducer as in claim 1 wherein t, w, L and m are selected so that for any value of S in the range $S_{min}$ to $S_{max}$, where S is the force sensitivity of the transducer, with positive values of S representing tensile forces and negative values representing compressive forces, and $S_{min}$ and $S_{max}$ are the minimum and maximum values of S respectively used to define the desired operating range, the following inequality holds:

$$\frac{f}{f_d} = \frac{w(1 + S)}{t\left(1 + S \frac{w^2}{t^2}\right)} \neq 1,$$

where $f_d$ is the fundamental resonant frequency of the bars in a spurious mode where the bars oscillate out of phase in a direction normal to the plane of the bars.

9. A transducer as in claim 8 wherein t, w, L and m are selected so that:

$$\frac{2f}{f_d} = \frac{2w(1 + S)}{t\left(1 + S \frac{w^2}{t^2}\right)} \neq 1.$$

10. A transducer as in claim 1 further including a pair of enlarged end portions to which respective ends of the bars are coupled, said enlarged end portions providing mounting surfaces for mounting the bars to a support structure while also defining L.

11. A transducer as in claim 1 wherein t, w, L, and m are selected so that for any value of S in the range $S_{min}$ to $S_{max}$, where S is the force sensitivity of the transducer, with positive values of S representing tensile forces and negative values representing compressive forces, and $S_{min}$ and $S_{max}$ are the minimum and maximum values of S respectively used to define the desired operating range, the following inequality holds:

$$\frac{2f}{f_{p1}} = \frac{2w L^2 (1 + S)}{t \, m^2 \left(1 + S \frac{L^2 w^2}{m^2 t^2}\right)} \neq 1.$$

where $f_{p1}$ is the fundamental resonant frequency of the bars in a spurious mode where the bars oscillate in phase in a direction normal to the plane of the bars.

12. A transducer as in claim 1 wherein t, w, L, and m are selected so that for any value of S in the range $S_{min}$ to $S_{max}$, where S is the force sensitivity of the transducer, with positive values of S representing tensile forces and negative values representing compressive forces, and $S_{min}$ and $S_{max}$ are the minimum and maximum values of S respectively used to define the desired operating range, the following inequality holds:

$$\frac{f}{f_{p2}} = \frac{0.363 \, w \, L^2}{t \, m^2} \frac{(1 + S)}{\left(1 + 0.49 \, S \frac{L^2 w^2}{m^2 t^2}\right)} \neq 1,$$

where $f_{p2}$ is the second overtone of the fundamental resonant frequency of the bars in a spurious mode where the bars oscillate in phase in a direction normal to the plane of the bars.

13. A transducer as in claim 1 wherein t, w, L, and m are selected so that for any value of S in the range $S_{min}$ to $S_{max}$, where S is the force sensitivity of the transducer, with positive values of S representing tensile forces and negative values representing compressive forces, and $S_{min}$ and $S_{max}$ are the minimum and maximum values of S respectively used to define the desired operating range, the following inequality holds:

$$\frac{2f}{f_{p2}} = \frac{0.726 \, w \, L^2}{t \, m^2} \frac{(1 + S)}{\left(1 + 0.49 \, S \frac{L^2 w^2}{m^2 t^2}\right)} \neq 1,$$

where $f_{p2}$ is the second overtone of the fundamental resonant frequency of the bars in a spurious mode where the bars oscillate in phase in a direction normal to the plane of the bars.

14. A transducer as in claim 1 wherein t, w, L, and m are selected so that for any value of S in the range $S_{min}$ to $S_{max}$, where S is the force sensitivity of the transducer, with positive values of S representing tensile forces and negative values representing compressive forces, and $S_{min}$ and $S_{max}$ are the minimum and maximum values of S respectively used to define the desired operating range, the following inequality holds:

$$\frac{f}{f_{p3}} = \frac{0.185 \, w \, L^2}{t \, m^2} \frac{(1 + S)}{\left(1 + 0.27 \, S \frac{L^2 w^2}{m^2 t^2}\right)} \neq 1,$$

where $f_{p3}$ is the third overtone of the fundamental resonant frequency of the bars in a spurious mode where the bars oscillate in phase in a direction normal to the plane of the bars.

15. A transducer as in claim 1 wherein t, w, L, and m are selected so that for any value of S in the range $S_{min}$ to $S_{max}$, where S is the force sensitivity of the transducer, with positive values of S representing tensile forces and negative values representing compressive forces, and $S_{min}$ and $S_{max}$ are the minimum and maximum values of S respectively used to define the desired operating range, the following inequality holds:

$$\frac{2f}{f_{p3}} = \frac{0.370\, w\, L^2}{t\, m^2} \frac{(1+S)}{\left(1 + 0.27\, S \frac{L^2 w^2}{m^2 t^2}\right)} \neq 1,$$

where $f_{p3}$ is the third overtone of the fundamental resonant frequency of the bars in a spurious mode where the bars oscillate in phase in a direction normal to the plane of the bars.

16. A transducer as in claim 1 wherein t, w, L, and m are selected so that for any value of S in the range $S_{min}$ to $S_{max}$, where S is the force sensitivity of the transducer, with positive values of S representing tensile forces and negative values representing compressive forces, and $S_{min}$ and $S_{max}$ are the minimum and maximum values of S respectively used to define the desired operating range, the following inequality holds:

$$\frac{2f}{f_d} = \frac{2w}{t} \frac{(1+S)}{\left(1 + S \frac{w^2}{t^2}\right)} \neq 1,$$

where $f_d$ is the fundamental resonant frequency of the bars in a spurious mode where the bars oscillate out of phase in a direction normal to the plane of the bars.

17. A vibratory, double-bar force transducer comprising a generally rectangular sheet of material having a thickness t, a width $2w+g$, and a length L, said sheet of material including an elongate slot having a length m and centrally located therein to divide the sheet into two bar segments, each having a width w, said slot having a width g, wherein $0.4 < t/w < 4$, and $L/m \geq 1$, and means for causing said bar segments to vibrate at a frequency f in substantially 180° phase opposition in a transverse direction, and means for determining the frequency of vibration of said bar segments.

18. A transducer as in claim 17 wherein said sheet of material is enlarged at its ends to have a width greater than $2w+g$, the distance separating the enlarged portions being L.

19. A transducer as in claim 17 or 18 wherein t, w, L, and m are selected so that for any value of S in the range $S_{min}$ to $S_{max}$, where S is the sensitivity of the transducer, with positive values of S representing tensile forces and negative values representing compressive forces, and $S_{min}$ and $S_{max}$ are the minimum and maximum values respectively of S used to define the desired operating range, at least one of the following inequalities holds:

$$\frac{f}{f_{p1}} = \frac{w\, L^2 (1+S)}{t\, m^2 \left(1 + S \frac{L^2 w^2}{m^2 t^2}\right)} \neq 1$$

$$\frac{2f}{f_{p1}} = \frac{2w\, L^2 (1+S)}{t\, m^2 \left(1 + S \frac{L^2 w^2}{m^2 t^2}\right)} \neq 1$$

-continued $$\frac{f}{f_{p2}} = \frac{0.363\, w\, L^2 (1+S)}{t\, m^2 \left(1 + 0.49\, S \frac{L^2 w^2}{m^2 t^2}\right)} \neq 1$$

$$\frac{2f}{f_{p2}} = \frac{0.726\, w\, L^2 (1+S)}{t\, m^2 \left(1 + 0.49\, S \frac{L^2 w^2}{m^2 t^2}\right)} \neq 1$$

$$\frac{f}{f_{p3}} = \frac{0.185\, w\, L^2 (1+S)}{t\, m^2 \left(1 + 0.27\, S \frac{L^2 w^2}{m^2 t^2}\right)} \neq 1$$

$$\frac{2f}{f_{p3}} = \frac{0.370\, w\, L^2 (1+S)}{t\, m^2 \left(1 + 0.27\, S \frac{L^2 w^2}{m^2 t^2}\right)} \neq 1$$

$$\frac{f}{f_d} = \frac{w(1+S)}{t\left(1 + S \frac{w^2}{t^2}\right)} \neq 1, \text{ or}$$

$$\frac{2f}{f_d} = \frac{2w(1+S)}{t\left(1 + S \frac{w^2}{t^2}\right)} \neq 1,$$

where $f_{p1}$ is the fundamental resonant frequency of the bars in a spurious mode where the bars oscillate in phase in a direction normal to the plane of the bars, $f_{p2}$ is the second overtone of $f_{p1}$, $f_{p3}$ is the third overtone of $f_{p1}$, and $F_d$ is the fundamental resonant frequency of the bars in a spurious mode where the bars oscillate out of phase in a direction normal to the plane of bars.

20. A vibratory force transducer comprising an elongate beam having a thickness t and width w, wherein $0.4 < t/w < 4$, means for causing said beam to resonate at a frequency f in a transverse direction, and wherein t and w are selected so that for any value of S in the range $S_{min}$ to $S_{max}$, where S is the force sensitivity of the transducer, with positive values of S representing tensile forces and negative values representing compressive forces, and $S_{min}$ and $S_{max}$ are the minimum and maximum values of S respectively used to define the desired operating range, at one of the following inequalities holds:

$$\frac{f}{f_{p1}} = \frac{w(1+S)}{t\left(1 + S \frac{w^2}{t^2}\right)} \neq 1$$

$$\frac{2f}{f_{p1}} = \frac{2w(1+S)}{t\left(1 + S \frac{w^2}{t^2}\right)} \neq 1$$

$$\frac{f}{f_{p2}} = \frac{0.363\, w\, (1+S)}{t\left(1 + 0.49\, S \frac{w^2}{t^2}\right)} \neq 1$$

$$\frac{2f}{f_{p2}} = \frac{0.726\, w\, (1+S)}{t\left(1 + 0.49\, S \frac{w^2}{t^2}\right)} \neq 1$$

-continued $$\frac{f}{f_{p3}} = \frac{0.185\,w\,(1+S)}{t\left(1 + 0.27\,\frac{w^2}{t^2}\right)} \neq 1, \text{ or}$$

$$\frac{2f}{f_{p3}} = \frac{0.370\,w\,(1+S)}{t\left(1 + 0.27\,S\,\frac{w^2}{t^2}\right)} \neq 1,$$

where $f_{p1}$ is the fundamental resonant frequency of the beam in a spurious mode where the beam oscillates in a direction normal to the transverse plane, $f_{p2}$ is the second overtone of $f_{p1}$, and $f_{p3}$ is the third overtone of $f_{p1}$.

21. A vibratory force transducer comprising
at least one elongate beam having a thickness t and a width w,
means for causing said beam to resonate at a frequency f in a transverse direction,
wherein t and w are selected so that for any value of S in the range $S_{min}$ to $S_{max}$, where S is the force sensitivity of the transducer, with positive values of S representing tensile forces and negative values representing compressive forces, and $S_{min}$ and $S_{max}$ are the minimum and maximum values of S respectively used to define the desired operating range, at least one of the following inequalities holds:

$$\frac{f}{f_{p1}} = \frac{w\,(1+S)}{t\left(1 + S\,\frac{w^2}{t^2}\right)} \neq 1$$

$$\frac{2f}{f_{p1}} = \frac{2w\,(1+S)}{t\left(1 + S\,\frac{w^2}{t^2}\right)} \neq 1$$

$$\frac{f}{f_{p2}} = \frac{0.363\,w\,(1+S)}{t\left(1 + 0.49\,S\,\frac{w^2}{t^2}\right)} \neq 1$$

$$\frac{2f}{f_{p2}} = \frac{0.726\,w\,(1+S)}{t\left(1 + 0.49\,S\,\frac{w^2}{t^2}\right)} \neq 1$$

$$\frac{f}{f_{p3}} = \frac{0.185\,w\,(1+S)}{t\left(1 + 0.27\,\frac{w^2}{t^2}\right)} \neq 1, \text{ or}$$

$$\frac{2f}{f_{p3}} = \frac{0.370\,w\,(1+S)}{t\left(1 + 0.27\,S\,\frac{w^2}{t^2}\right)} \neq 1,$$

where $f_{p1}$ is the fundamental resonant frequency of the beam in a spurious mode where the beam oscillates in a direction normal to the transverse plane, $f_{p2}$ is the second overtone of $f_{p1}$, and $f_{p3}$ is the third overtone of $f_{p1}$.

22. A vibratory force transducer comprising
a pair of elongate, generally parallel bars coupled together at their ends and adapted to vibrate 180° out of phase in a transverse direction, said bars having a thickness t and a width w, the distance between locations at which the bar ends are coupled together being m and the lengths of the bars being generally L,
means for causing said bars to resonate at a frequency f in substantially 180° phase opposition in a transverse direction,
wherein t, w, L, and m are selected so that for any value of S in the range $S_{min}$ and $S_{max}$, where S is the force sensitivity of the transducer, with positive values of S representing tensile forces and negative values representing compressive forces, and $S_{min}$ and $S_{max}$ are the minimum and maximum values of S respectively used to define the desired operating range, at least one of the following inequalities holds:

$$\frac{f}{f_{p1}} = \frac{w\,L^2\,(1+S)}{t\,m^2\left(1 + S\,\frac{L^2\,w^2}{m^2\,t^2}\right)} \neq 1$$

$$\frac{2f}{f_{p1}} = \frac{2w\,L^2\,(1+S)}{t\,m^2\left(1 + S\,\frac{L^2\,w^2}{m^2\,t^2}\right)} \neq 1$$

$$\frac{f}{f_{p2}} = \frac{0.363\,w\,L^2\,(1+S)}{t\,m^2\left(1 + 0.49\,S\,\frac{L^2\,w^2}{m^2\,t^2}\right)} \neq 1$$

$$\frac{2f}{f_{p2}} = \frac{0.726\,w\,L^2\,(1+S)}{t\,m^2\left(1 + 0.49\,S\,\frac{L^2\,w^2}{m^2\,t^2}\right)} \neq 1$$

$$\frac{f}{f_{p3}} = \frac{0.185\,w\,L^2\,(1+S)}{t\,m^2\left(1 + 0.27\,S\,\frac{L^2\,w^2}{m^2\,t^2}\right)} \neq 1$$

$$\frac{2f}{f_{p3}} = \frac{0.370\,w\,L^2\,(1+S)}{t\,m^2\left(1 + 0.27\,S\,\frac{L^2\,w^2}{m^2\,t^2}\right)} \neq 1$$

$$\frac{f}{f_d} = \frac{w\,(1+S)}{t\left(1 + S\,\frac{w^2}{t^2}\right)} \neq 1, \text{ or}$$

$$\frac{2f}{f_d} = \frac{2w\,(1+S)}{t\left(1 + S\,\frac{w^2}{t^2}\right)} \neq 1$$

where $f_{p1}$ is the fundamental resonant frequency of the bars in a spurious mode where the bars oscillate in phase in a direction normal to the plane of the bars, $f_{p2}$ is the second overtone of $f_{p1}$, $f_{p3}$ is the third overtone of $f_{p1}$, and $f_d$ is the fundamental resonant frequency of the bars in a spurious mode where the bars oscillate out of phase in a direction normal to the plane of the bars.

* * * * *